(12) United States Patent
Yamazaki et al.

(10) Patent No.: US 7,936,700 B2
(45) Date of Patent: May 3, 2011

(54) DELAY TIME MEASURING METHOD AND SYSTEM OF ECHO REQUEST/RESPONSE IN NETWORK, AND STATION AND PROGRAM USED IN THE SAME SYSTEM

(75) Inventors: Tatsuo Yamazaki, Tokyo (JP); Koya Yasuda, Tokyo (JP)

(73) Assignee: NEC Corporation, Tokyo (JP)

( * ) Notice: Subject to any disclaimer, the term of this patent is extended or adjusted under 35 U.S.C. 154(b) by 149 days.

(21) Appl. No.: 12/343,816

(22) Filed: Dec. 24, 2008

(65) Prior Publication Data
US 2009/0168655 A1 Jul. 2, 2009

(30) Foreign Application Priority Data
Dec. 27, 2007 (JP) ................................. 2007-337667

(51) Int. Cl.
*H04L 12/26* (2006.01)
(52) U.S. Cl. ...................... 370/252; 370/241.1; 370/258; 709/224
(58) Field of Classification Search .................. 370/252, 370/241, 241.1, 254, 258; 709/224
See application file for complete search history.

(56) References Cited

U.S. PATENT DOCUMENTS

| | | | | |
|---|---|---|---|---|
| 6,958,977 | B1* | 10/2005 | Mitrani et al. | 370/252 |
| 2003/0115321 | A1* | 6/2003 | Edmison et al. | 709/224 |
| 2005/0249115 | A1* | 11/2005 | Toda et al. | 370/229 |
| 2006/0239204 | A1* | 10/2006 | Bordonaro et al. | 370/253 |
| 2007/0189187 | A1* | 8/2007 | Ryu et al. | 370/252 |
| 2008/0031136 | A1* | 2/2008 | Gavette et al. | 370/235 |
| 2009/0168655 | A1* | 7/2009 | Yamazaki et al. | 370/241.1 |

FOREIGN PATENT DOCUMENTS
JP 2004242194 A 8/2004
* cited by examiner

*Primary Examiner* — Ricky Ngo
*Assistant Examiner* — Luat Phung

(57) ABSTRACT

There is provided a unit capable of performing calculation of delay time between a measuring station and a station to be measured by using an echo request/response frame in any block and at any time in a manner being independent from time-synchronization. To a payload portion of an OAM (Operations, Administration and Maintenance) echo request/response frame to be used for an OAM testing are added "request transmitting time" being the time at which an OAM echo request has been transmitted from the measuring station and "response receiving time" being the time at which the measuring station has received an OAM response from the station to be measured. After termination of the testing, the OAM echo request/response frame stored in a data buffer is read at arbitrary time and the request transmitting time added to the frame and response receiving time are extracted to calculate delay time between the measuring station and the station to be measured.

24 Claims, 10 Drawing Sheets

OAM Echo Request/Response Frame Format

OAM Echo Request/Response Frame Format

LRTT Request/Response Frame Format

OAM Echo Request/Response Frame Format

DELAY TIME MEASURING METHOD AND SYSTEM OF ECHO REQUEST/RESPONSE IN NETWORK, AND STATION AND PROGRAM USED IN THE SAME SYSTEM

INCORPORATION BY REFERENCE

This application is based upon and claims the benefit of priority from Japanese Patent Application No. 2007-337667, filed on Dec. 27, 2007, the disclosure of which is incorporated herein in its entirely by reference.

BACKGROUND OF THE INVENTION

1. Field of the Invention

The present invention relates to a delay time measuring method and system of an echo request/response between stations in a network and a station and a program used in the same system, and more particularly to the delay time measuring method and system using an OAM (Operations, Administration and Maintenance) echo request/response frame in an RPR (Resilient Packet Ring) system, and the station and the program used in the same system.

2. Description of the Related Art

As a related packet communication technology in a ring network in which a plurality of node devices is connected through a bilateral dual ring line, the RPR (Resilient Packet Ring) system standardized in IEEE 802.17 is known (for example, Patent Reference 1 [Japanese Patent Application Laid-open No. 2004-242194]).

In the RPR system, each of stations being a node connected on a bilateral dual ring line has functions, by using a control packet being transmitted periodically by each station, and by advertising a physical address thereof on the bilateral dual ring line and collecting the adverised information to recognize a topology map (arrangement information) indicating an alignment order of each station. Also, each station has further functions of selecting a ring system near to a physical address of a destination by referring to the topology map when a packet is transmitted to the ring.

The IEEE 802.17 designates both an OAM echo testing function in the RPR system and also an OAM echo request/response frame to be used for OAM echo testing. According to OAM echo request/response frame specifications, a testing station transmits an OAM echo request/response frame to a station to be tested and confirms continuity between the stations by receiving the OAM echo response frame returned from the station to be tested.

The operation of the continuity confirming test using the OAM echo function in the RPR system is described by referring to FIGS. 5 to 8.

FIG. 5 shows an example of a basic configuration of the RPR system as a related art in which RPR stations 11 to 18 are arranged in the order of alignment of each station shown in FIG. 5 in the bilateral dual ring network connected by an outer ring and an inner ring. A specified MAC (Media Access Control) address is assigned to each of the RPR stations 11 to 18.

FIG. 6 shows an image of arrival of the OAM echo request frame transmitted to the RPR stations 11 to 14 in order to confirm continuity. FIG. 7 shows an image of arrival of the OAM echo response frame from the RPR station 14 through the RPR stations 13, 12, and 11. FIG. 8 shows a configuration of an OAM echo request/response frame designated by the IEEE 802.17 recommendation. In FIG. 8, the RPR frame is represented by a 128-bit width and a Padding region is a convenient region to represent the RPR frame by the 128-bit width (therefore, if the RPR frame is represented by an 8-bit width, the Padding region becomes unnecessary.).

When the continuity from the RPR station 11 to the RPR station 14 is confirmed, in the RPR station 11, an address value (its own address value) of the RPR station 11 is stored in the MAC (Media Access Control) source address of the OAM echo request/response shown in FIG. 8 and an address value of the RPR station 14 is stored in the MAC destination address and, as shown in FIG. 6, the continuity confirmation test between the RPR station 11 and RPR station 14 in the case when the OAM request is transmitted through the outer-side link is performed.

The intermediate RPR stations 12 and 13, since the received OAM echo request frame is not destined to their own addresses, perform an operation of bridge outputting of the received OAM request/response frame to a neighboring RPR station.

The RPR station 14, when receiving the OAM echo request frame destined to the address thereof, stores its own address in the MAC source address and returns, through an inner-side link, an OAM echo response frame in which the MAC address of the RPR station 11 being a destination is stored in the MAC destination address. The RPR station 11 completes the continuity confirmation by the OAM response frame received through the intermediate stations 13 and 12.

In the specification of the OAM echo request/response frame to be used for the OAM echo testing designated by the IEEE 802.17, only the function of confirming continuity between stations by a testing station's transmitting an OAM echo request frame and receiving an OAM response frame returned from the station to be tested, however, the function of measuring delay time between the stations is not included in the continuity testing using the OAM echo request/response frame.

The IEEE 802.17 designates a function of measuring an LRTT (Loop Round Trip Time) as a function of measuring delay time between stations. FIG. 9 shows a format of the LRTT request/response frame (in the case of 128-bit parallel transport).

In the LRTT measuring test designated by the IEEE 802.17, delay time between an RPR station carrying out the measurement and an RPR station to be measured is periodically measured. In this test, following operations are performed:

1. A measuring station, when sending out an LRTT request frame destined to a station to be measured, adds the sending-out time in the form of "LatencyTimeStamp" to the LRTT request frame.
2. A station to be measured, when receiving the LRTT request frame, sends back the LRTT response frame to the measuring station. At this point of time, the station to be measured adds receiving time of the LRTT request frame in the form of "tailLatencyIn" and sending-out time of the LRTT response frame in the form of "tailLatencyOut" to the LRTT response frame.
3. The measuring station having received the LRTT response frame calculates the delay time between the measuring station and the station to be measured by computing the receiving time using an expression [t4−t1−(t3−t2)], where t1 denotes the "LatencyTimeStamp"; t2 denotes the "tailLatencyIn"; t3 denotes the "tailLatencyOut"; and t4 denotes the "receiving time".

The aim of applying the subtraction (t3−t2) in the above expression is to calculate net delay time required for passing through a ring by excluding time taken for returning the frame by the station to be measured.

However, the LRTT measuring method has problems. That is, the IEEE 802.17 recommendation designates that the LRTT testing is to be performed by setting a service class to be A0 class (fixed) and, therefore, the value obtained by using the LRTT is a value measured with the first priority service class being set. As a result, a problem arises that it is impossible to measure the time by setting an arbitrary service class. Another problem is that; since the LRTT testing is an inner process of measuring the time periodically, a user or an operator cannot use the testing as a means to confirm actual delay time.

On the other hand, in the IEEE 802.17 Maintenance, a proposal is made as an extended plan in which the information about the LatencyTimeStamp, TailLatencyIn, and TailLatencyOut is provided in the payload of the OAM echo request/response frame to add a function of measuring delay time being equivalent to the LRTT function to the OAM echo testing function.

In the IEEE 802.17 Maintenance, there is a description of the addition of the information about the LatencyTimeStamp, the TailLatencyIn, and the TailLatencyOut, however, there is no description of how the information described above is provided. Presuming that the above information is provided in the frame being the same as the LRTT request/response frame, the OAM echo request/response frame as shown in FIG. 10 is prepared in which the LatencyTimeStamp, TailLatencyIn, and TailLatencyOut are provided in the order shown in FIG. 10 after the response control in the frame.

By using the extended OAM echo request/response frame format shown in FIG. 10, confirmation of continuity between stations and measurement of delay time can be simultaneously performed. Moreover, in the case of the OAM echo testing, there is no designation in the IEEE 802.17 recommendation as to which service class is used for the testing and, therefore, testing is allowed by using any service class. As a result, by using the extended OAM echo request/response frame format, delay time can be measured by setting any service class.

However, the extended OAM echo request/response frame format, as shown in FIG. 10, is so configured that the LatencyTimeStamp, the TailLatencyIn, and the TailLatencyOut are provided as a time stamp written after the response control in the frame and delay time measured between a measuring station and a station to be measured using the OAM echo request/response frame is calculated, as in the case of the LRTT measurement, by using the calculating the expression [t4−t1−(t3−t2)], where t1 denotes the "LatencyTimeStamp"; t2 denotes the "tailLatencyIn"; t3 denotes the "tailLatencyOut"; and t4 denotes the "receiving time".

Accordingly, when this configuration is employed, time information received by the receiving section of the measuring station is used as the receiving time of a response frame and, therefore, time-synchronization between the receiving section and transmitting section within not only the measuring station but also the station to be measured is required and, further, the receiving of the response frame and calculation of the delay time have to be simultaneously performed.

SUMMARY OF THE INVENTION

In view of the above, it is an object of the present invention to provide a means capable of performing calculation of delay time in any block and at any time in a manner being independent from time-synchronization by a delay time measuring function using the OAM echo request/response frame proposed in the IEEE 802.17 Maintenance.

According to a first aspect of the present invention, there is provided a delay time measuring method of an echo request/response in a network for measuring delay time of the echo request/response between a measuring station and a station to be measured by using an echo testing function in the network, including:

a first step of the measuring station adding a "request transmitting time" showing time at which an echo request/response frame has been transmitted to the echo request/response frame and sending out the echo request/response frame with the added "request transmitting time" to the station to be measured;

a second step of the station to be measured receiving the echo request/response frame with the added "request transmitting time" transmitted from the measuring station and transmitting to return the received echo request/response frame to the measuring station;

a third step of the measuring station adding further, when the echo request/response frame transmitted to be returned from the station to be measured has been received, a "response receiving time" showing time at which the echo request/response frame returned from the station to be measured has been received to the returned echo request/response frame and storing the returned echo request/response frame with the further added "response receiving time" in a data buffer; and a fourth step of the measuring station measuring delay time of the echo request/response between the measuring station and the station to be measured by reading the returned echo request/response frame stored in the data buffer and extracting the "request transmitting time" and "response receiving time" from the read returned echo request/response frame.

According to a second aspect of the present invention, there is provided a delay time measuring system of an echo request/response in a network for measuring delay time of the echo request/response between a measuring station and a station to be measured by using an echo testing function in the network, wherein the measuring station includes a first processing section as a request processing/transmitting section, a third processing section as a response receiving/processing section and a fourth processing section as a delay time measuring section and the station to be measured includes a second processing section as a request receiving/response transmitting section, wherein the first processing section adds a "request transmitting time" showing time at which an echo request/response frame has been transmitted to the echo request/response frame and sends out the echo request/response frame with the added "request transmitting time" to the station to be measured, wherein the second processing section receives the echo request/response frame with the added "request transmitting time" transmitted from the measuring station and transmits to return the received echo request/response frame to the measuring station, wherein the third processing section adds further a "response receiving time" showing time at which the measuring station has received the echo request/response frame returned from the station to be measured to the returned echo request/response frame and stores the returned echo request/response frame with the further added "response receiving time" in a data buffer, and wherein the fourth processing section measures delay time of the echo request/response between the measuring station and the station to be measured by reading the returned echo request/response frame stored in the data buffer and extracting the "request transmitting time" and "response receiving time" from the read returned echo request/response frame.

According to a third aspect of the present invention, there is provided a station having a function of measuring/being measured delay time of an echo request/response between a measuring station and a station to be measured by using an echo testing function in a network, the station including a first processing section as a request processing/transmitting section, a third processing section as a response receiving/processing section, and a fourth processing section as a delay time measuring section, the first, the third and the fourth processing sections being respectively used when the station serves as the measuring station, and a second processing section as a request receiving/response transmitting section which is used when the station serves as the station to be measured, wherein the first processing section adds a "request transmitting time" showing time at which an echo request/response frame has been transmitted to the echo request/response frame and sends out the echo request/response frame with the added "request transmitting time" to another station to be measured, wherein the third processing section adds further a "response receiving time" showing time at which the echo request/response frame transmitted to be returned from the other station to be measured has been received to the returned echo request/response frame and stores the returned echo request/response frame with the further added "response receiving time" in a data buffer, wherein the fourth processing section reads the returned echo request/response frame stored in the data buffer to extract the "request transmitting time" and the "response receiving time" from the read returned echo request/response frame and measures delay time of the echo request/response between the station serving as the measuring station and the other station to be measured, and wherein the second processing section receives an echo request/response frame with an added "request transmitting time" transmitted from another measuring station and transmits to return the received echo request/response frame to the other measuring station.

According to a fourth aspect of the present invention, there is provided a delay time measuring program stored in a computer-readable storage medium and incorporated in a station having a function of measuring/being measured delay time of an echo request/response between a measuring station and a station to be measured by using an echo testing function in a network, the station including a first processing section as a request processing/transmitting section, a third processing section as a response receiving/processing section, and a fourth processing section as a delay time measuring section, the first, the third and the fourth processing sections being respectively used when the station serves as the measuring station, and a second processing section as a request receiving/response transmitting section which is used when the station serves as the station to be measured, the program to have a computer function as the first to the fourth processing sections, wherein the first processing section adds a "request transmitting time" showing time at which an echo request/response frame has been transmitted to the echo request/response frame and sends out the echo request/response frame with the added "request transmitting time" to another station to be measured, wherein the third processing section adds further a "response receiving time" showing time at which the echo request/response frame transmitted to be returned from the other station to be measured has been received to the returned echo request/response frame and stores the returned echo request/response frame with the further added "response receiving time" in a data buffer, wherein the fourth processing section reads the returned echo request/response frame stored in the data buffer to extract the "request transmitting time" and the "response receiving time" from the return returned echo request/response frame and measures delay time of the echo request/response between the station serving as the measuring station and the other station to be measured, and wherein the second processing section receives an echo request/response frame with an added "request transmitting time" transmitted from another measuring station and transmits to return the received echo request/response frame to the other measuring station.

With the above configurations, owing to the addition of "request transmitting time" and "response receiving time" to the OAM echo response frame received from the station to be measured, delay time between the measuring station and station to be measured can be calculated in any block and at any time in a manner being independent from time synchronization.

With another configuration as above, the time stamp function can be performed only in the measuring station, thereby readily realizing the delay time measuring system.

With still another configuration as above, if the time stamp function is performed only in the measuring station, for example, in the case of application to the OAM echo request frame of the RPR system, by setting the address of the measuring station to a MAC destination address of the OAM echo request frame, delay time in one round-trip of the RPR ring can be easily calculated.

With still another configuration as above, when the OAM request/response frame is used in the form of an extended one, simultaneous measurement of the continuity between the stations and delay time is made possible and, further, the measurement using the LRTT is not performed by setting the service class to be the most priority A0 class, a user or operator can confirm actual delay time by applying an arbitrary service class.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EXEMPLARY EMBODIMENTS

Best modes of carrying out the present invention will be described in further detail using various exemplary embodiments with reference to the accompanying drawings.

Figure 1:
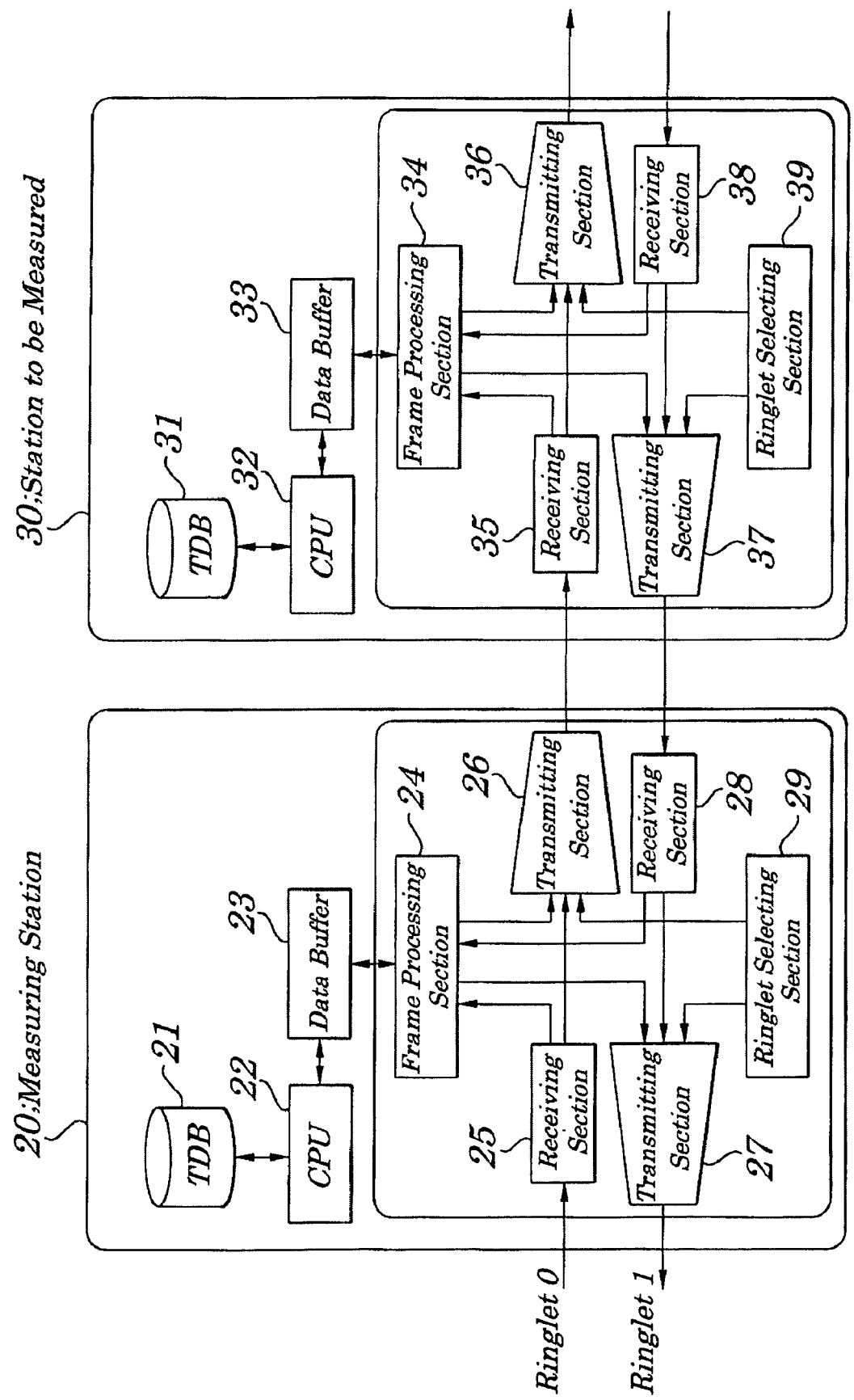
FIG. 1 is a block diagram showing configurations of main components to perform an OAM echo processing in an RPR station to which the present invention is applied.

FIG. 1 is a block diagram showing configurations of main components to perform an OAM echo processing in an RPR station to which the present invention is applied.

In FIG. 1, a measuring station 20 and a station to be measured 30 are shown. Instead, the reference numeral 30 maybe the measuring station 20 and reference numeral 20 may be the station to be measured 30. Each of the measuring station 20 and the station to be measured 30 has the same configurations and, therefore, inner configurations of the measuring station 20 are described.

The measuring station 20 includes a TDB (Topology Data Base) 21, a CPU (Central Processing Unit) 22, and a data buffer 23 which stores information to be transmitted and received and is used as memory to save results from arithmetic operations.

The CPU 22 is connected to memory such as a ROM (Read Only Memory) storing programs performing various operations of stations which also include programs making the RPR station perform a function of measuring delay time of an echo request/response between stations by using the OAM testing function. In the exemplary embodiment, the CPU 22 reads the program stored in the memory and performs, according to the read program, the operation of measuring delay time of the echo request/response between the stations using the OAM testing function. Therefore, the CPU 22 and memory have a function as a computer to execute the measuring processing program of the echo request/response delay time using the OAM testing function of the present invention.

The measuring station 20 also has a frame processing section 24 which constructs an OAM echo frame. The measuring station further includes receiving sections 25 and 28 which perform error processing of a received signal and/or perform an operation of destination judgment and transmitting sections 26 and 27 which perform processing of multiplexing a control frame such as an OAM echo frame and a user frame for outputting to a neighboring station. The measuring station also includes a ringlet selecting section 29 which is used to select a direction of a signal to be sent out by the RPR station.

First Exemplary Embodiment

Figure 2:
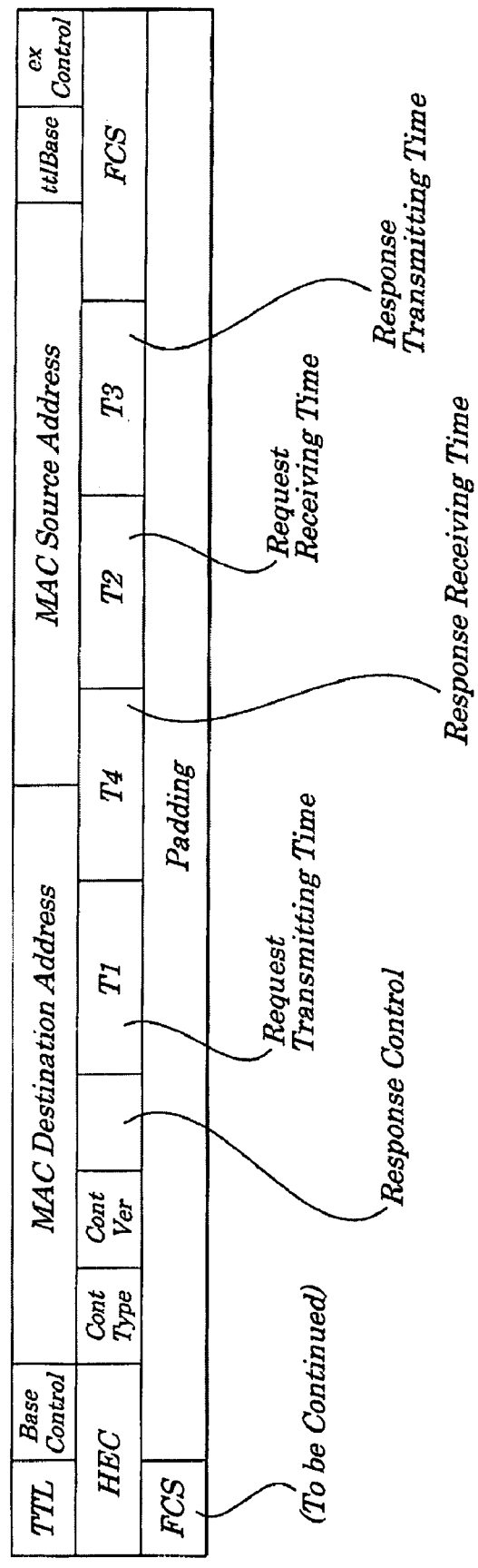
FIG. 2 is a diagram showing an extended OAM echo request/response frame format according to a first exemplary embodiment of the present invention.

FIG. 2 is a diagram showing an extended OAM echo request/response frame format of the first exemplary embodiment of the present invention.

In the extended OAM echo request/response frame of the present invention, to "request transmitting time" is added an OAM echo request transmitting time from a measuring station and to "response receiving time" is added time at which the measuring station has received an OAM echo response from a station to be measured.

Also, to "request receiving time" is added time at which the station to be measured has received an OAM echo request from the measuring station and to "response transmitting time" is added time at which the station to be measured has transmitted an OAM echo response to the measuring station. Moreover, a length (number of bits) of a time stamp of each frames and its order can be changed as appropriate and are not limited by the format configurations shown in FIG. 2.

Data fields other than "request transmitting time", "response receiving time", "request receiving time" and "response transmitting time" in the extended OAM echo request/response frame of the first exemplary embodiment are well known by those skilled in the art and are not related to the present invention and their detailed descriptions are omitted accordingly.

Next, operations of the extended OAM echo request/response of the exemplary embodiment will be described by referring to FIGS. 1 to 2.

In FIG. 1, when the measuring station 20 performs the measurement of delay time between the measuring station 20 and the station to be measured, the CPU 22 adds the "request transmitting time" to OAM echo request information read from the data buffer 23 destined to the station to be measured 30 and transfers the added OAM echo request information to the frame processing section 24.

The frame processing section 24 of the measuring station 20 stores an address value (its own address value) of the measuring station 20 as the MAC source address in the OAM echo request/response frame and an address value of the station to be measured 30 as the MAC destination address and adds the "request transmitting time" to construct the OAM echo request frame and decides a transmitting direction of a ringlet 0 or 1 to output the frame to the transmitting section 26 or 27. For example, if the frame is to be transmitted to the ringlet 0 direction, the transmitting section 26 transmits a user frame signal and multiplexed OAM echo request frame signal to the station to be measured 30.

The OAM echo request received by a receiving section 35 of the station to be measured 30 is transmitted to a frame processing section 34. The frame processing section 34 constructs the OAM echo response frame obtained by rewriting the MAC source address and MAC destination address in order to return a response to the OAM echo request received from the measuring station 20 and returns the constructed frame through a transmitting section 37 to the ringlet 1 direction being reversed to the receiving direction.

At this time point, the frame processing section 34 of the station to be measured 30 adds time at which the station to be measured 30 has received the OAM echo request frame from the measuring station 20 as "request receiving time" to the above OAM echo response frame to be transmitted to the measuring station 20 and also adds transmitting time of the above OAM echo response frame to be transmitted to the measuring station 20 as "response transmitting time".

In the measuring station 20, the receiving section 28 receives the OAM echo response from the station to be measured 30 and transfers the received OAM echo response to the frame processing section 24. The frame processing section 24 adds receiving time as "response receiving time" to the OAM echo response frame destined to its own station and then stores the added frame into the data buffer 23.

Thereafter, the CPU 22 reads the above OAM echo response frame stored in the data buffer 23 at arbitrary time to extract "request transmitting time", "response receiving time", "request receiving time" and "response transmitting time" and determines delay time between the measuring station 20 and the station to be measured 30 by performing calculation using an expression [T4−T1−(T3−T2)] where T1 denotes the "request transmitting time"; T2 denotes the "request receiving time"; T3 denotes the "response transmitting time"; and T4 denotes the "response receiving time".

According to the first exemplary embodiment, owing to the addition of "request transmitting time", "response receiving time", "request receiving time", and "response transmitting time" to the OAM echo response frame received from the station to be measured 30, delay time between the measuring station 20 and station to be measured 30 can be calculated in any block and at any time in a manner being independent from time synchronization.

According to the exemplary embodiment, by changing a service class in the process of RPR encapsulation of an OAM echo, delay time can be measured for individual class. The information about the service class is added to a header (part of base control) of the RPR frame and by changing the value (to be specified by an operator at time of testing), the change of the service class is made possible.

Furthermore, according to the exemplary embodiment, owing to the calculation of delay time between the OAM echo request receiving time and the OAM response transmitting time, the influence by returning process in the station to be measured 30 on the error in the delay time can be eliminated.

Second Exemplary Embodiment

Figure 3:
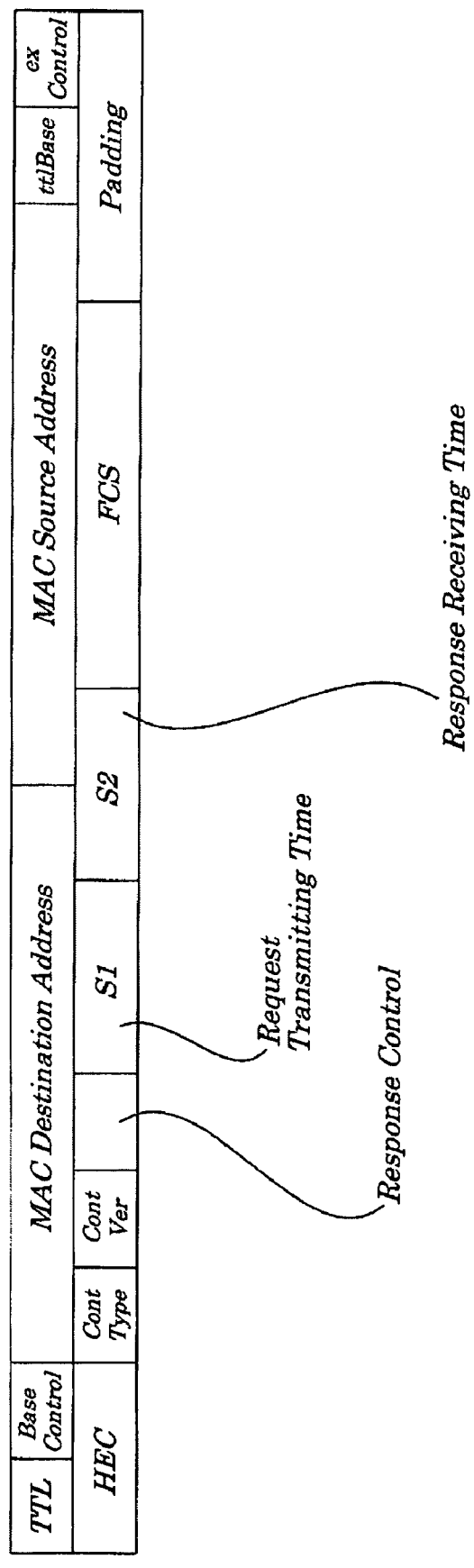
FIG. 3 is a diagram showing an extended OAM echo request/response frame format according to a second exemplary embodiment of the present invention.

FIG. 3 is a diagram showing an extended OAM echo request/response frame format of the second exemplary embodiment of the present invention.

The extended OAM echo request/response frame of the second exemplary embodiment is so configured that the "request receiving time" and "response transmitting time" added to the OAM echo request/response frame of the first exemplary embodiment are omitted and only the "request transmitting time" being the OAM echo request transmitting time being the time at which the measuring station has transmitted an OAM echo request and "response receiving time" being the time at which the measuring station has received an OAM echo response from the station to be measured are added. Moreover, a length (number of bits) of a time stamp of each frames and its order can be changed as appropriate and are not limited by the format configurations shown in FIG. 3.

In ordinary cases, delay time between stations is measured on the order of several hundred microseconds. However, in the case where returning process of the OAM echo request/response frame is performed by hardware processing, the time taken for the returning process is generally on the order of nanoseconds or microseconds and, therefore, the time is regarded as sufficiently small.

A granularity (unit of a time stamp showing in what second unit a value of the time stamp is incremented by one) of the time stamp employed in the case of the LRTT is 1 μs and the delay time measured using the LRTT is used for internal processing of the RPR (therefore, preciseness is required to some extent) and, therefore, the delay time is measured precisely, however, in the case of the OAM echo request/response measurement, precise measurement as required for the LRTT measurement is not necessary.

In the second exemplary embodiment, providing that time taken for the returning processing in the station to be measured is negligibly small, by saving the band required for the OAM echo testing (that is, by reducing an amount of the time stamp to be installed) and by simplifying the calculating expression of delay time compared with the case of the first exemplary embodiment, the calculation of delay time in the receiving section of the measuring station is made more simplified.

Next, operations of the extended OAM echo request/response of the second exemplary embodiment are described by referring to FIGS. 1 and 3.

When the measuring station 20 performs the measurement of delay time between the measuring station 20 and the station to be measured 30, the CPU 22 adds "request transmitting time" to an OAM echo request information destined to the station to be measured 30, read from the data buffer 23 and transfers the added OAM echo request information to the frame processing section 24.

The frame processing section 24 of the measuring station 20 stores an address value (its own address value) of the measuring station 20 in the MAC source address of the OAM echo request/response frame and an address value of the station to be measured 30 in the MAC destination address of the OAM echo request/response frame and adds the "request transmitting time" to construct the OAM echo request frame and decides a transmitting direction of the ringlet 0 or 1 to output the frame to the transmitting section 26 or 27 of the measuring station 20. For example, if the frame is to be transmitted to the ringlet 0 direction, the transmitting section 26 of the measuring station 20 transmits a user frame signal and multiplexed OAM echo request frame signal to the station to be measured 30.

The OAM echo request received by the receiving section 35 of the station to be measured 30 is transferred to the frame processing section 34 of the station to be measured. The frame processing section 34 of the station to be measured 30 constructs the obtained OAM echo response frame by rewriting the MAC source address and MAC destination address in order to return a response to the OAM echo request received from the measuring station 20 and returns the constructed frame through the transmitting section 37 to the ringlet 1 direction being reversed to the receiving direction.

According to the second exemplary embodiment, writing of the time stamp information is not required in the station to be measured 30 and, therefore, in the station to be measured 30, neither storing the information in a data buffer 33 nor the processing of a CPU is performed. As a result, the turnaround time of returning by the station to be measured 30 is shortened, whereby reducing the influence on delay time.

In the measuring station 20, the receiving section 28 receives the OAM echo response from the station to be measured 30, and transfers the received OAM echo response to the frame processing section 24. The frame processing section 24 adds receiving time as "response receiving time" to the OAM echo response frame destined to the measuring station 20 and stores the added OAM echo response frame in the data buffer 23.

Thereafter, the CPU 22 of the measuring station 20 reads the above OAM echo response frame stored in the data buffer 23 at arbitrary time to extract "request transmitting time" and "response receiving time", determines delay time between the measuring station 20 and the station to be measured 30 by performing calculation using an expression (S2−S1), where S1 denotes "request transmitting time" and S2 denotes "response receiving time".

Thus, according to the second exemplary embodiment, when compared in the case of the first exemplary embodiment, it is made possible to save a band to be used for the OAM echo request/response operation and to realize the measurement of delay time of the OAM echo request/response in the RPR system with more simplified configurations.

Also, in the second exemplary embodiment, the time stamp function is installed only in he measuring station, not in the station to be measured and, therefore, the measuring function of delay time can be easily achieved.

Moreover, according to the second exemplary embodiment, owing to the addition of "request transmitting time" and "response receiving time" to the OAM echo response frame received from the station to be measured 30, delay time between the measuring station 20 and station to be measured 30 can be calculated in any block and at any time in a manner being independent from time synchronization.

Third Exemplary Embodiment

Figure 4:
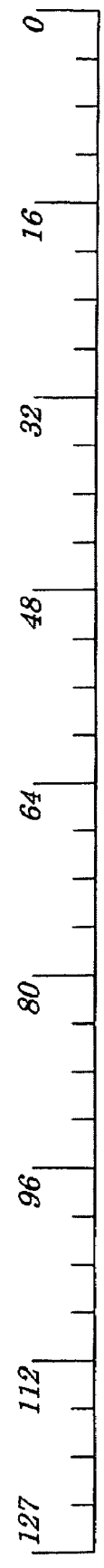
FIG. 4 is a diagram showing an extended OAM echo request/response frame format according to a third exemplary embodiment of the present invention.
Figure 4:
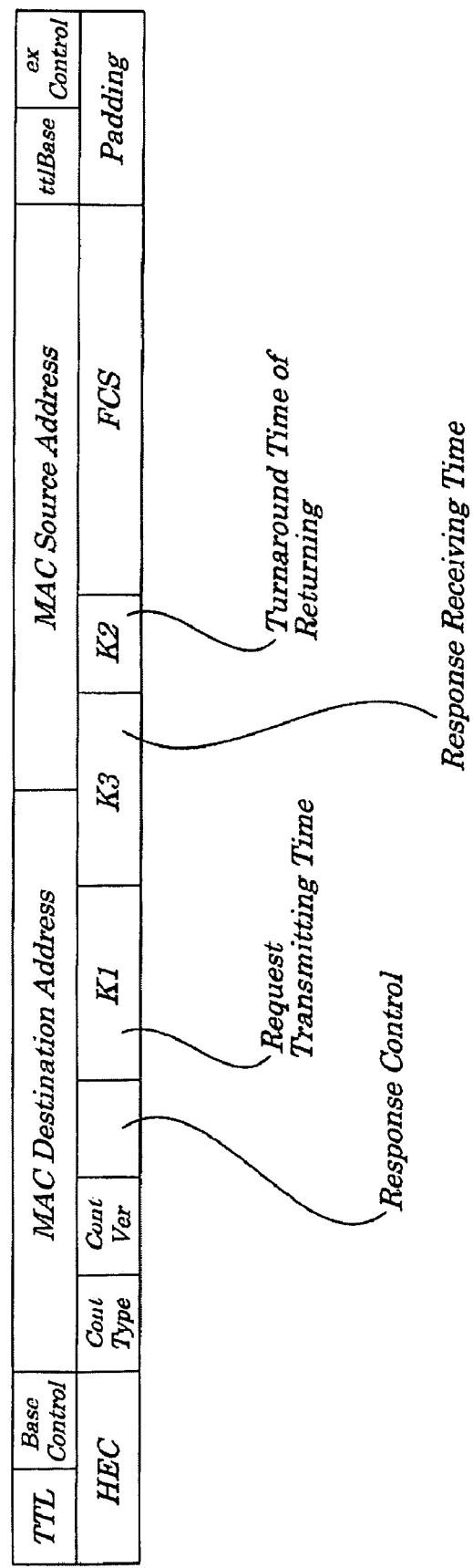
Figure 5:
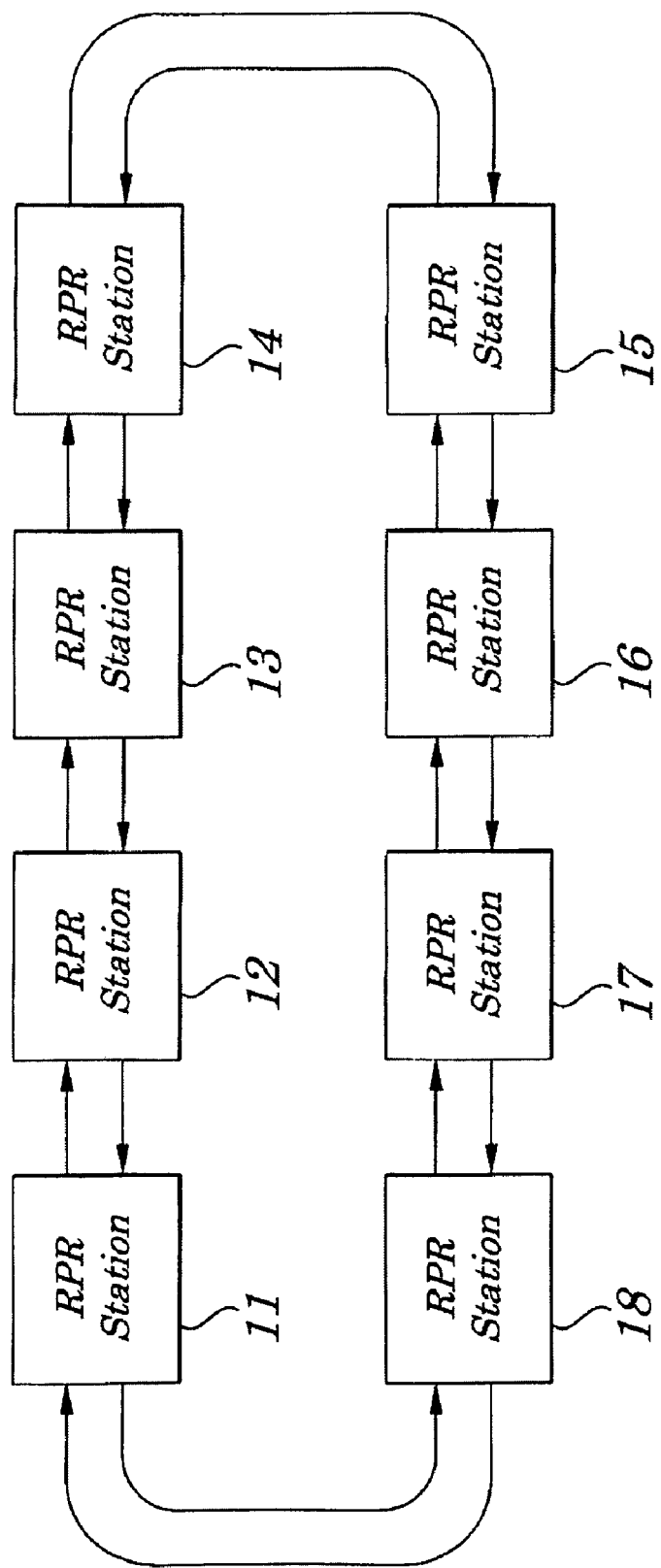
FIG. 5 is an example of a basic configuration of the RPR system as a related art.
Figure 6:
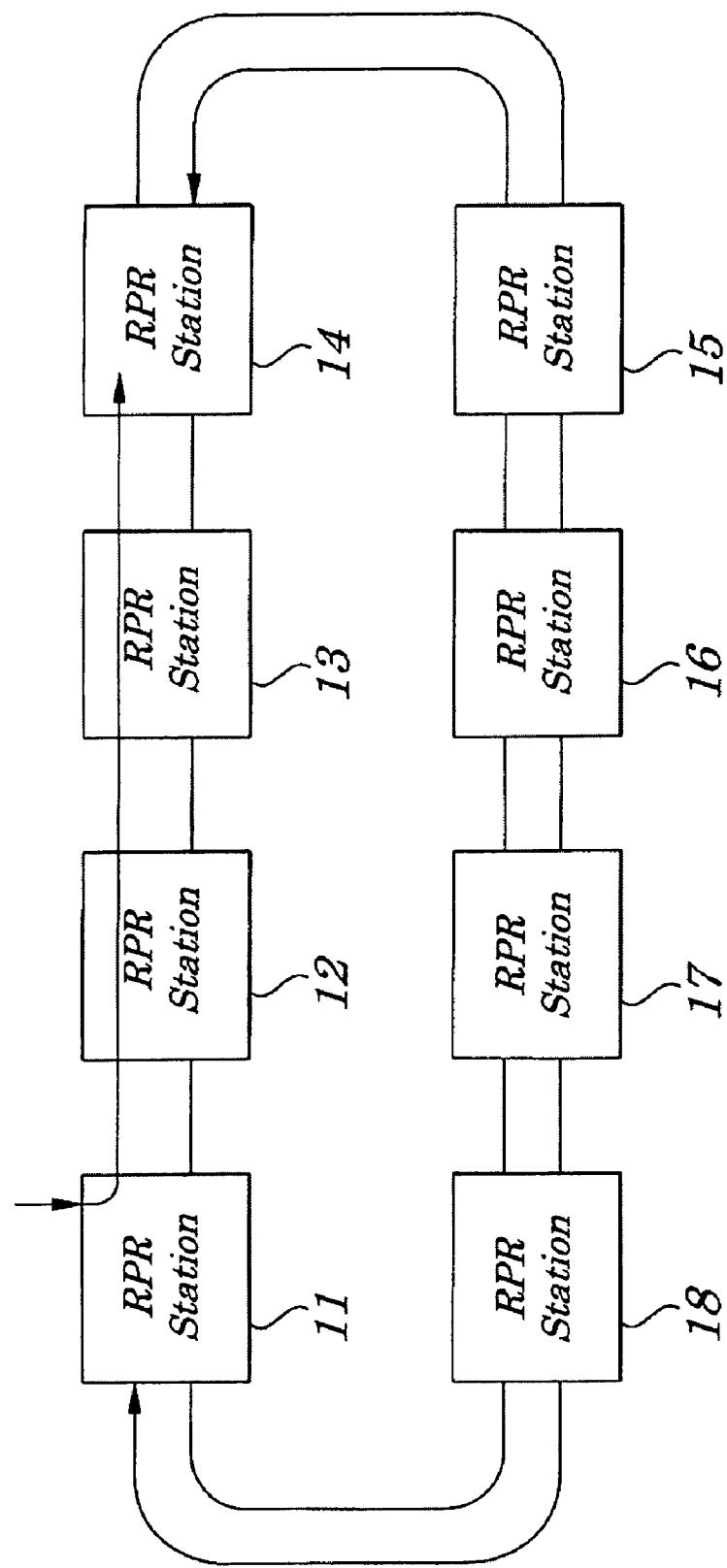
FIG. 6 is a diagram showing an image of arrival of the OAM echo request frame in order to confirm continuity between stations as the related art.
Figure 7:
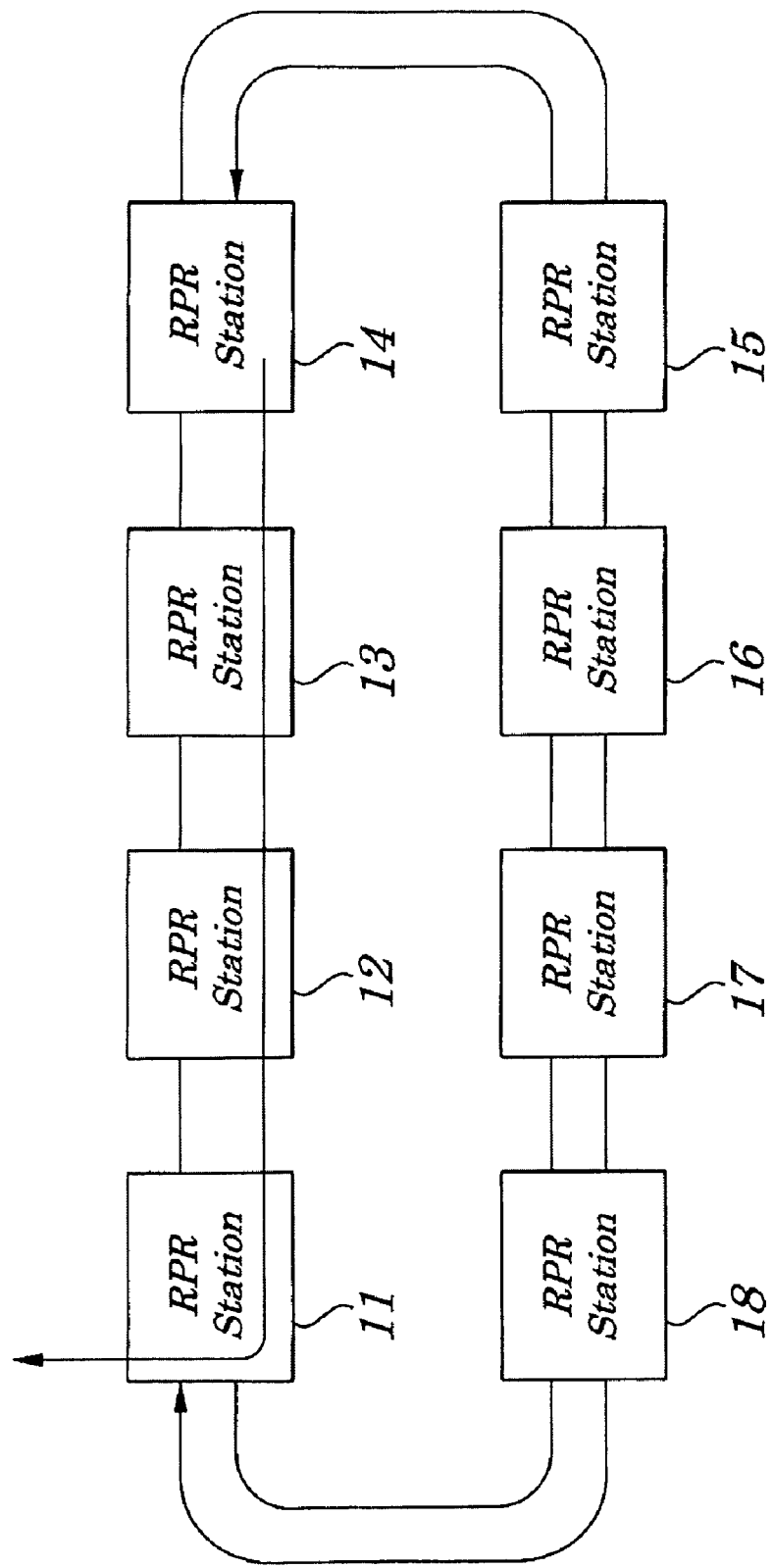
FIG. 7 is also a diagram showing an image of arrival of the OAM echo response frame in order to confirm continuity between stations as the related art.
Figure 8:
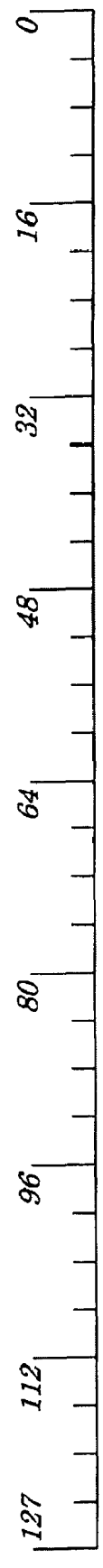
FIG. 8 is a diagram showing a configuration of an OAM echo request/response frame designated by the IEEE 802.17 recommendation as a related art.
Figure 9:
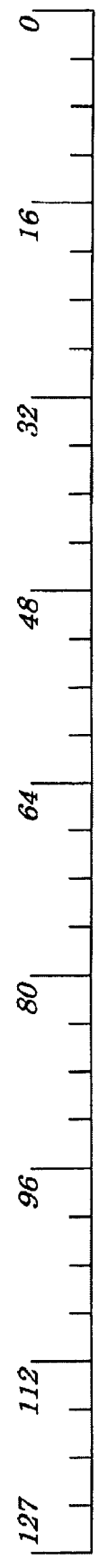
FIG. 9 is a diagram showing an example of a format of an LRTT (Loop Round Trip Time) as a related art.
Figure 10:
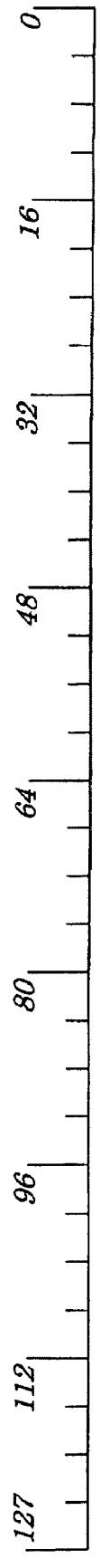
FIG. 10 is a diagram showing an example of a format of an OAM echo request/response frame proposed as an extended plan in the IEEE 802.17 Maintenance as a related art.

FIG. 4 is a diagram showing an extended OAM echo request/response frame format of the third exemplary embodiment of the present invention.

According to the configuration of the extended OAM echo frame of the third exemplary embodiment, instead of the addition of "request receiving time" and "response transmitting time" to the OAM echo request/response frame employed in the first exemplary embodiment, a station to be measured 30 measures the time taken for processing between the time at which the OAM echo request/response frame has been received and the time at which the OAM echo request/response frame has been transmitted to return and the measured time taken for the processing is added as "turnaround time of returning" to the payload portion of the OAM echo response frame to be returned to a measuring station. Moreover, a length (number of bits) of a time stamp of each frame and its order can be changed as appropriate and are not limited by the format configurations shown in FIG. 4.

In the third exemplary embodiment, turnaround time of returning in the station to be measured is taken into consideration and, therefore, measuring accuracy of delay time can be more enhanced when compared with the case of the second exemplary embodiment.

Further, it is presumed that the time required for the measurement of the turnaround time of returning is considerably shorter than the time required for the measurement of delay time (when the returning process is performed by hardware processing, the time required for the returning process is on the order of nanoseconds or microseconds, while delay time is measured, for example, as in the case of a PING (Packet INternet Groper) command, on the order of several hundred microseconds.) and, therefore, the number of bits required for the region to be used for the returning processing is smaller than that required for the region to be used for the request receiving/response transmitting processing and, as a result, it is made possible to save more band required for the OAM echo testing (that is, the amount of the time stamp can be reduced) when compared with the case of the first exemplary embodiment.

Further, calculating expression of delay time can be simplified more when compared with that employed in the case of the first exemplary embodiment and, therefore, a delay time calculating circuit in the receiving station of the measuring station can be more easily configured when compared with the case of the first exemplary embodiment.

Next, operations of the extended OAM echo request/response of the third exemplary embodiment are described by referring to FIGS. 1 and 4.

When the measuring station 20 performs the measurement of delay time between the measuring station 20 and the station to be measured 30, the CPU 22 adds "request transmitting time" to an OAM echo request information destined to the station to be measured 30, read from the data buffer 23, and transfers the added OAM echo request information to the frame processing section 24 of the measuring station 20.

The frame processing section 24 of the measuring station 20 stores an address value (its own address value) of the measuring station 20 in the MAC source address of the OAM echo request/response frame and an address value of the station to be measured 30 in the MAC destination address of the OAM echo request/response frame and adds the "request transmitting time" to construct the OAM echo request frame and decides a transmitting direction of the ringlet 0 or 1 to output the frame to the transmitting section 26 or 27 of the measuring station 20. For example, if the frame is to be transmitted to the ringlet 0 direction, the transmitting section 26 transmits a user frame signal and multiplexed OAM echo request frame signal to the station to be measured 30.

The OAM echo request received by the receiving section 35 of the station to be measured 30 is transferred to the frame processing section. The frame processing section 34 of the station to be measured 30 constructs the obtained OAM echo response frame by rewriting the MAC source address and MAC destination address in order to return a response to the OAM echo request received from the measuring station 20 and returns the constructed frame through the transmitting section 37 to the ringlet 1 direction being reversed to the receiving direction.

At this time point, the frame processing section 34 of the station to be measured 30 calculates, by using time information in the station to be measured 30, a span of time required for processing from the receiving of the OAM echo request frame to the transmitting of the OAM echo response frame to be returned and adds the calculated span of time as "turnaround time of returning" to the payload of the OAM echo response frame to be sent back to the measuring station 20.

In the measuring station 20, the OAM echo response frame received by the receiving section 28 is transferred to the frame processing section 24. The frame processing section 24 adds the receiving time as "response receiving time" to the OAM echo response frame destined to the measuring station 20 and stores the added OAM echo response frame in the data buffer 23.

Thereafter, the CPU 22 reads the above OAM echo response frame stored in the data buffer 23 at arbitrary time to extract "request transmitting time", "response receiving time" and "turnaround time of returning", determines delay time between the measuring station 20 and the station to be measured 30 by performing calculation using an expression (K3−K1−K2), where K1 denotes the "request transmitting time", K2 denotes the "turnaround time of returning", and K3 denotes the "response receiving time".

According to the third exemplary embodiment, owing to the addition of "request transmitting time", "response receiving time", and "turnaround time of returning" to the OAM echo response frame received from the station to be measured 30, delay time between the measuring station 20 and station to be measured 30 can be calculated in any block and at any time in a manner being independent from time-synchronization.

While the invention has been particularly shown and described with reference to exemplary embodiments thereof, the invention is not limited to these exemplary embodiments. It will be understood by those of ordinary skill in the art that various changes in form and details may be made therein without departing from the sprit and scope of the present invention as defined by the claims.

For example, in the above exemplary embodiments of the present invention, the case is explained where the measurement of delay time of the OAM echo request/response in the RPR system is performed on the RPR station, however, the present invention can be applied to the delay time measuring test of the echo request/response in any network other than the RPR system.

In this case, the measurement can be achieved by the configuration in which "request transmitting time" showing the time at which an echo request frame has been transmitted from a measuring station and "response receiving time" showing the time at which an echo response frame returned from a station to be measured has been received are added to the echo request/response frame used for the echo request/response testing in the network, or by the configuration in which "request transmitting time" showing the time at which an echo request has been transmitted from a measuring station, "response receiving time" showing the time at which an echo response frame returned from a station o be measured has been received, "request receiving time" showing the time at which the echo request frame in the station to be measured has been received, and "response transmitting time" showing the time at which the echo response frame in the station to be measured has been transmitted are added to the echo request/response frame, or by the configuration in which "request transmitting time" showing the time at which an echo request frame has been transmitted from a measuring station, "response receiving time" showing the time at which an echo response frame returned from a station to be measured has been received, and "turnaround time of returning" showing the time taken for processing from receiving of the echo request frame in the station to be measured to the transmitting of the echo response frame are added to the echo request/response frame.

What is claimed is:

1. A delay time measuring method of an echo request/response in an RPR (Resilient Packet Ring) system for measuring delay time of the echo request/response between a measuring station and a station to be measured on a bilateral dual ring network by using an OAM (Operations, Administration, and Maintenance) echo testing function in the RPR system, comprising:

a first step of said measuring station adding a "request transmitting time" showing time at which an OAM echo request/response frame has been transmitted to the OAM echo request/response frame and sending out the OAM echo request/response frame with the added "request transmitting time" to said station to be measured;

a second step of said station to be measured receiving the OAM echo request/response frame with the added "request transmitting time" transmitted from said measuring station and transmitting to return the received OAM echo request/response frame to said measuring station;

a third step of said measuring station adding further, when the OAM echo request/response frame transmitted to be returned from said station to be measured has been received, a "response receiving time" showing time at which the OAM echo request/response frame returned from said station to be measured has been received to the returned OAM echo request/response frame and storing the returned OAM echo request/response frame with the further added "response receiving time" in a data buffer; and a fourth step of said measuring station measuring delay time of the echo request/response between said measuring station and said station to be measured by reading the returned OAM echo request/response frame stored in said data buffer and extracting the "request transmitting time" and "response receiving time" from the read returned OAM echo request/response frame, wherein the delay time is measured for an individual service class by changing a service class in a process of encapsulating an OAM echo.

2. The delay time measuring method of the echo request/response in the RPR system according to claim 1, wherein, in the fourth step, said measuring station measures the delay time of the echo request/response between said measuring station and said station to be measured, by using the extracted "request transmitting time" and "response receiving time" and by calculating an expression (S2−S1), where S1 denotes "request transmitting time" and S2 denotes "response receiving time".

3. The delay time measuring method of the echo request/response in the RPR system according to claim 1, wherein said station to be measured adds a "request receiving time" showing time at which said station to be measured has received the OAM echo request/response frame transmitted from said measuring station and a "response transmitting time" showing time at which said station to be measured has transmitted to return the received OAM echo/response frame to said measuring station to the received OAM echo request/response frame, and wherein, in the fourth step, said measuring station extracts the "request transmitting time", the "response receiving time", the "request receiving time", and the "response transmitting time" from the read returned OAM echo request/response frame and measures the delay time of the echo request/response between said measuring station and said station to be measured.

4. The delay time measuring method of the echo request/response in the RPR system according to claim 3, wherein, in the fourth step, said measuring station measures the delay time of the echo request/response between said measuring station and said station to be measured, by using the extracted "request transmitting time", "response receiving time", "request receiving time", and "response transmitting time" and by calculating an expression [T4−T1−(T3−T2)], where T1 denotes the "request transmitting time"; T2 denotes the "request receiving time"; T3 denotes the "response transmitting time"; and T4 denotes the "response receiving time".

5. The delay time measuring method of the echo request/response in the RPR system according to claim 1, wherein said station to be measured adds a "turnaround time of returning" showing time taken for processing from receiving the OAM echo request/response frame transmitted from said measuring station to transmitting to return the OAM echo received request/response frame to said measuring station to the received OAM echo request/response frame, and wherein, in the fourth step, said measuring station extracts the "request transmitting time", the "response receiving time", and the "turnaround time of returning" from the read returned OAM echo request/response frame and measures the delay time of the echo request/response between said measuring station and said station to be measured.

6. The delay time measuring method of the echo request/response in the RPR system according to claim 5, wherein, in the fourth step, said measuring station measures the delay time of the echo request/response between said measuring station and said station to be measured, by using the extracted "request transmitting time", "response receiving time", and "turnaround time of returning" and by calculating an expression (K3−K1−K2), where K1 denotes the "request transmitting time", K2 denotes the "turnaround time of returning", and K3 denotes the "response receiving time".

7. A delay time measuring system of an echo request/response in an RPR (Resilient Packet Ring) system for measuring delay time of the echo request/response between a measuring station and a station to be measured on a bilateral dual ring network by using an OAM (Operations, Administration, and Maintenance) echo testing function in the RPR system, wherein said measuring station comprises a first processing section as a request processing/transmitting section, a third processing section as a response receiving/processing section and a fourth processing section as a delay time measuring section and said station to be measured comprises a second processing section as a request receiving/response transmitting section, wherein said first processing section adds a "request transmitting time" showing time at which an OAM echo request/response frame has been transmitted to the OAM echo request/response frame and sends out the OAM echo request/response frame with the added "request transmitting time" to said station to be measured, wherein said second processing section receives the OAM echo request/response frame with the added "request transmitting time" transmitted from said measuring station and transmits to return the received OAM echo request/response frame to said measuring station, wherein said third processing section adds further a "response receiving time" showing time at which said measuring station has received the OAM echo request/response frame returned from said station to be measured to the returned OAM echo request/response frame and stores the returned OAM echo request/response frame with the further added "response receiving time" in a data buffer, and wherein said fourth processing section measures delay time of the echo request/response between said measuring station and said station to be measured by reading the returned OAM echo request/response frame stored in said data buffer and extracting the "request transmitting time" and "response receiving time" from the read returned OAM echo request/response frame, wherein the system has a function to measure the delay time for an individual service class by changing a service class in a process of encapsulation an OAM echo.

8. The delay time measuring system of the echo request/response in the RPR system according to claim 7, wherein said fourth processing section measures the delay time of the echo request/response between said measuring station and said station to be measured, by using the extracted "request transmitting time" and "response receiving time" and by calculating an expression (S2−S1), where S1 denotes "request transmitting time" and S2 denotes "response receiving time".

9. The delay time measuring system of the echo request/response in the RPR system according to claim 7, wherein said second processing section as the request receiving/response transmitting section adds a "request receiving time" showing time at which said station to be measured has received the OAM echo request/response frame transmitted from said measuring station and a "response transmitting time" showing time at which said station to be measured has transmitted to return the received OAM echo request/response frame to said measuring station to the received OAM echo request/response frame, and wherein said fourth processing section extracts the "request transmitting time", the "response receiving time", the "request receiving time", and the "response transmitting time" from the read returned OAM echo request/response frame and measures the delay time of the echo request/response between said measuring station and said station to be measured.

10. The delay time measuring system of the echo request/response in the RPR system according to claim 9, wherein said fourth processing section measures the delay time of the echo request/response between said measuring station and said station to be measured, by using the extracted "request transmitting time", "response receiving time", "request receiving time", and "response transmitting time" and by calculating an expression [T4−T1−(T3−T2)], where Ti denotes the "request transmitting time"; T2 denotes the "request receiving time"; T3 denotes the "response transmitting time"; and T4 denotes the "response receiving time".

11. The delay time measuring system of the echo request/response in the RPR system according to claim 7, wherein said second processing section as the request receiving/response transmitting section adds a "turnaround time of returning" showing time taken for processing from receiving the OAM echo request/response frame transmitted from said measuring station to transmitting to return the OAM echo received request/response frame to said measuring station to the received OAM echo request/response frame, and wherein said fourth processing section extracts the "request transmitting time", the "response receiving time", and the "turnaround time of returning" from the read returned OAM echo request/response frame and measures the delay time of the echo request/response between said measuring station and said station to be measured.

12. The delay time measuring system of the echo request/response in the RPR system according to claim 11, wherein said fourth processing section measures the delay time of the echo request/response between said measuring station and said station to be measured, by using the extracted "request transmitting time", "response receiving time", and "turnaround time of returning" and by calculating an expression (K3−K1−K2), where K1 denotes the "request transmitting time", K2 denotes the "turnaround time of returning", and K3 denotes the "response receiving time".

13. A station having a function of measuring/being measured delay time of an echo request/response between a measuring station and a station to be measured on a bilateral dual ring network of an RPR (Resilient Packet Ring) system by using an OAM (Operations, Administration, and Maintenance) echo testing function in the RPR system, the station comprising a first processing section as a request processing/transmitting section, a third processing section as a response receiving/processing section, and a fourth processing section as a delay time measuring section, the first, the third and the fourth processing sections being respectively used when the station serves as the measuring station, and a second processing section as a request receiving/response transmitting section which is used when the station serves as the station to be measured, wherein said first processing section adds a "request transmitting time" showing time at which an OAM echo request/response frame has been transmitted to the OAM echo request/response frame and sends out the OAM echo request/response frame with the added "request transmitting time" to another station to be measured, wherein said third processing section adds further a "response receiving time" showing time a: which the OAM echo request/response frame transmitted to be returned from the other station to be measured has been received to the returned OAM echo request/response frame and stores the returned OAM echo request/response frame with the further added "response receiving time" in a data buffer, wherein said fourth processing section reads the returned OAM echo request/response frame stored in said data buffer to extract the "request transmitting time" and the "response receiving time" from the read returned OAM echo request/response frame and measures delay time of the echo request/response between the station serving as the measuring station and the other station to be measured, and wherein said second processing section receives an OAM echo request/response frame with an added "request transmitting time" transmitted from another measuring station and transmits to return the received OAM echo request/response frame to the other measuring station, wherein the station further has a function to measure the delay time for an individual service class by changing a service class in a process of encapsulation an OAM echo.

14. The station according to claim 13, wherein said fourth processing section measures the delay time of the echo request/response between said measuring station and said station to be measured, by using the extracted "request transmitting time" and "response receiving time" and by calculating an expression (S2−S1), where S1 denotes "request transmitting time" and S2 denotes "response receiving time".

15. The station according to claim 13, wherein said second processing section receives the OAM echo request/response frame with the added "request transmitting time" transmitted from the other measuring station and transmits to return the received OAM echo request/response frame to the other measuring station, by adding a "request receiving time" showing time at which the OAM echo request/response frame transmitted from the other measuring station has been received and a "response transmitting time" showing time at which the received OAM echo request/response frame has been transmitted to he returned to the other measuring station to the received OAM echo request/response frame, and wherein said fourth processing section extracts the "request transmitting time", the "response receiving time", the "request receiving time" and the "response transmitting time" from the read returned OAM echo request/response frame to measure delay time of the echo request/response time between the station serving as the measuring station and the other station to be measured.

16. The station according to claim 15, wherein said fourth processing section has a unit to measure, by using the extracted "request transmitting time", "response receiving time", "request receiving time", and "response transmitting time", delay time of the echo request/response between said measuring station and said station to be measured and by calculating an expression [T4−T1−(T3−T2)], where T1 denotes the "request transmitting time"; T2 denotes the "request receiving time"; T3 denotes the "response transmitting time"; and T4 denotes the "response receiving time".

17. The station according to claim 13, wherein said second processing section receives the OAM echo request/response frame with the added "request transmitting time" transmitted from the other measuring station and transmits to return the received OAM echo request/response frame to the other measuring station, by adding a "turnaround time of returning" showing time taken for processing from receiving of the OAM echo request/response frame transmitted from the other measuring station to transmitting to return the received OAM echo request/response frame to the other measuring station, and wherein said fourth processing section extracts the "request transmitting time", the "response receiving time", and "the turnaround time of returning" from the read returned OAM echo request/response frame to measure delay time of the echo request/response time between the station serving as the measuring station and the other station to be measured.

18. The station according to claim 17, wherein said fourth processing section has a unit to measure, by using the extracted "request transmitting time", "response receiving time", and "turnaround time of returning", delay time of the echo request/response between said measuring station and said station to be measured and by calculating an expression (K3−K1−K2), where K1 denotes the "request transmitting time", K2 denotes the "turnaround time of returning", and K3 denotes the "response receiving time".

19. A non-transitory computer-readable storage medium storing a delay time measuring program and being incorporated in a station having a function of measuring/being measured delay time of an echo request/response between a measuring station and a station to be measured on a bilateral dual ring network of an RPR (Resilient Packet Ring) system by using an OAM (Operations, Administration, and Maintenance) echo testing function in the RPR system, the station comprising a first processing section as a request processing/transmitting section, a third processing section as a response receiving/processing section, and a fourth processing section as a delay time measuring section, the first, the third and the fourth processing sections being respectively used when the station serves as the measuring station, and a second processing section as a request receiving/response transmitting section which is used when the station serves as the station to be measured, the program to have a computer function as said first to said fourth processing sections, wherein said first processing section adds a "request transmitting time" showing time at which an OAM echo request/response frame has been transmitted to the OAM echo request/response frame and sends out the OAM echo request/response frame with the added "request transmitting time" to another station to be measured, wherein said third processing section adds further a "response receiving time" showing time at which the OAM echo request/response frame transmitted to be returned from the other station to be measured has been received to the returned OAM echo request/response frame and stores the returned OAM echo request/response frame with the further added "response receiving time" in a data buffer, wherein said fourth processing section reads the returned OAM echo request/response frame stored in said data buffer to extract the "request transmitting time" and the "response receiving time" from the read returned OAM echo request/response frame and measures delay time of the echo request/response between the station serving as the measuring station and the other station to be measured, and wherein said second processing section receives an OAM echo request/response frame with an added "request transmitting time" transmitted from another measuring station and transmits to return the received OAM echo request/response frame to the other measuring station, wherein the station further has a function to measure the delay time for an individual service class by changing a service class in a process of encapsulation an OAM echo.

20. The non-transitory computer-readable storage medium according to claim 19, wherein said fourth processing section measures the delay time of the echo request/response between said measuring station and said station to be measured, by using the extracted "request transmitting time" and "response receiving time" and by calculating an expression (S2−S1), where S1 denotes "request transmitting time" and S2 denotes "response receiving time".

21. The non-transitory computer-readable storage medium according to claim 19, wherein said second processing section receives the OAM echo request/response frame with the added "request transmitting time" transmitted from the other measuring station and transmits to return the received OAM echo request/response frame to the other measuring station, by adding a "request receiving time" showing time at which the OAM echo request/response frame transmitted from the other measuring station has been received and a "response transmitting time" showing time at which the received OAM echo request/response frame has been transmitted to be returned to the other measuring station to the received OAM echo request/response frame, and wherein said fourth processing section extracts the "request transmitting time", the "response receiving time", the "request receiving time" and the "response transmitting time" from the read returned OAM echo request/response frame to measure delay time of the echo request/response time between the station serving as the measuring station and the other station to be measured.

22. The non-transitory computer-readable storage medium according to claim 21, wherein said fourth processing section has a unit to measure, by using the extracted "request transmitting time", "response receiving time", "request receiving time", and "response transmitting time", delay time of the echo request/response between said measuring station and said station to be measured and by calculating an expression [T4−T1−(T3−T2)], where T1 denotes the "request transmitting time"; T2 denotes the "request receiving time"; T3 denotes the "response transmitting time"; and T4 denotes the "response receiving time".

23. The non-transitory computer-readable storage medium according to claim 19, wherein said second processing section receives the OAM echo request/response flame with the added "request transmitting time" transmitted from the other measuring station and transmits to return the received OAM echo request/response flame to the other measuring station, by adding a "turnaround time of returning" showing time taken for processing from receiving of the OAM echo request/response flame transmitted from the other measuring station to transmitting to return the received OAM echo request/response flame to the other measuring station, and wherein said fourth processing section extracts the "request transmitting time", the "response receiving time", and "the turnaround time of returning" from the read returned OAM echo request/response flame to measure delay time of the echo request/response time between the station serving as the measuring station and the other station to be measured.

24. The non-transitory computer-readable storage medium according to claim 23, wherein said fourth processing section has a unit to measure, by using the extracted "request transmitting time", "response receiving time", and "turnaround time of returning", delay time of the echo request/response between said measuring station and said station to be measured and by calculating an expression (K3−K1−K2), where K1 denotes the "request transmitting time", K2 denotes the "turnaround time of returning", and K3 denotes the "response receiving time".

* * * * *